April 22, 1969  L. B. VAN VLIET, JR  3,439,971

WIDE-ANGLE VIEWING DEVICE

Filed Sept. 17, 1964

INVENTOR.
Lyman B. VanVliet, Jr.
BY
Hugh L. Fisher
ATTORNEY

United States Patent Office 3,439,971
Patented Apr. 22, 1969

3,439,971
WIDE-ANGLE VIEWING DEVICE
Lyman B. Van Vliet, Jr., Santa Barbara, Calif., assignor to General Motors Corporation, Detroit, Mich., a corporation of Delaware
Filed Sept. 17, 1964, Ser. No. 397,138
Int. Cl. G02b 23/00, 23/02, 17/00
U.S. Cl. 350—45                                    4 Claims

ABSTRACT OF THE DISCLOSURE

A wide-angle viewing device is disclosed which includes two unity power telescopes arranged in tandem within a housing of rectangular cross-section provided with highly reflective interior surfaces.

---

This invention relates to a wide-angle viewing system and more particularly to an improved periscopic-type rear vision device suitable for use in a motor vehicle.

A well-designed periscope is actually a telescope with a very large field of view and a uniformly illuminated field which can be fitted into a long narrow tube. Generally speaking, as the number of lenses in the periscope increases, the field of view of the system increases or the required tube diameter decreases. In order to obtain a wide field in a long narrow periscope, many well-corrected lenses with deep curves are required. The high cost of such periscopes obviates their use for many applications such as, for example, a rear view system of an automobile.

The wide angle viewing device of the present invention uses relatively shallow long focus lenses which are inexpensive and inherently free of many aberrations. The device comprises two subsystems each consisting of a unity power telescope having a pair of objective lenses and a field lens. The two subsystems are positioned in tandem within a rectangular housing having highly reflective inner surfaces. Only four objective lenses and two field lenses are required regardless of the length of the periscope. Since the system is symmetric, it is therefore relatively free of distortion, coma, lateral chromatic aberration and chromatic variation in magnification.

A more complete understanding of the present invention may be had from the following detailed description which should be read in conjunction with the drawings in which.

Figure 1:
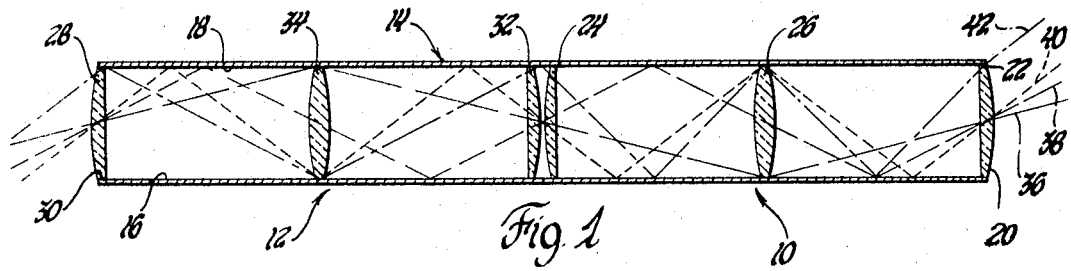
FIGURE 1 is a horizontal sectional view showing the essential components of an optical system embodying the invention and showing the paths of certain light rays.

Referring now to the drawings and initially to FIGURE 1, the wide-angle viewing device of the present invention comprises two identical subsystems 10 and 12. Each of the systems 10 and 12 is positioned in optical alignment within a rectangular housing 14 having plane mirror walls 16 and 18 which are parallel to the optical axis of the system. A second pair of plane mirrors (not shown) are arranged on the vertical interior walls of the housing 14.

The subsystem 10 comprises an objective lens 20 positioned in an entrance aperture 22 of the housing 14 and a second objective lens 24 spaced from the lens 20 a distance substantially equal to the sum of their respective focal lengths. A first field lens 26 is positioned at the focal plane of the lenses 20 and 24.

The subsystem 12 is identical in all respects with the subsystem 10 and comprises an objective lens 28 mounted in an exit aperture 30 of the housing 14 and an objective lens 32 spaced from the lens 28 a distance substantially equal to the sum of their respective focal lengths. A second field lens 34 is positioned in the housing 14 at the focal plane of the lenses 28 and 32. The objective lenses 32 and 24 are in an abutting relationship and may, if desired, be formed of a single lens.

The path of travel of a number of representative light rays 36 through 42 is shown in FIGURE 1 and it will be observed that each of the light rays 36 through 42 exit from the objective lens 28 at the same angle as the entrance angle at the objective lens 20. Thus, in effect the viewing aperture at the lens 28 has been transferred to the lens 20.

Figure 2:
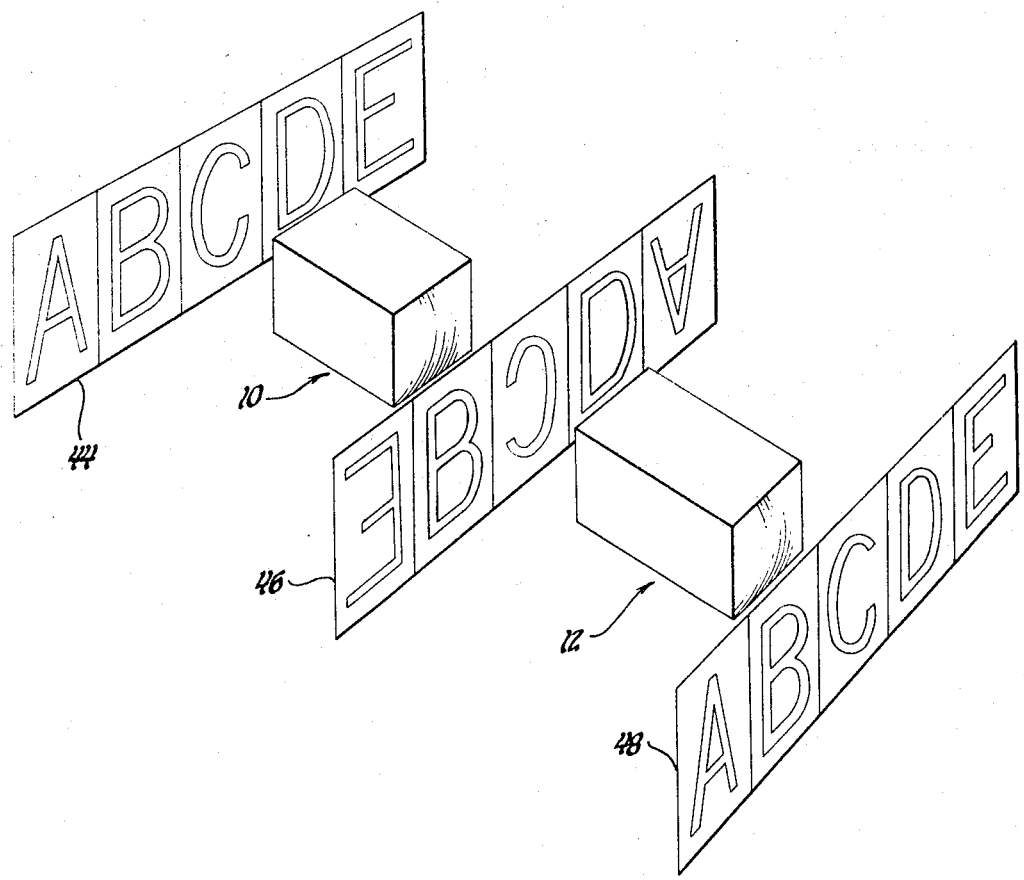
FIGURE 2 is a sketch depicting the functional aspects of the optical system with regards to a scene in object space.

The first subsystem 10 divides a scene in object space into approximately equal angular fields which will be arranged in the following manner. Those field angles which have reflected from the mirrored walls 16 and 18 an even number of times will appear as in any simple telescope, that is, inverted and reverted and correctly positioned in the overall field. Those field angles which reflect an odd number of times from the mirrored walls 16 and 18 appear inverted and exit from the first subsystem at angles of opposite sign to those of their entrance angles. These field angles, therefore, appear to be reversed with respect to their normal position as related to the center of the field. This can be more clearly seen from FIGURE 2 wherein the scene in object space is represented by the letters A, B, C, D, E generally designated 44. If it is assumed that the light rays from the area represented by the letter C undergo zero reflection, from B and D one reflection and from A and E two reflections, then the scene at 44 is scrambled and would appear as shown at 46 if the viewer's eye were placed immediately behind subsystem 10. Since the light rays exiting the subsystem 10 and entering the subsystem 12 are subject to be the same number of reversals, the scrambled scene 46 will be unscrambled so that the original scene 44 is correctly viewed as shown at 48. Thus, the final view 48 is precisely the same as the original scene 44. The device has been described with regards to the behavior of the light rays which are reflected from the vertical mirrors 16 and 18 but it will be apparent that light rays are also reflected from the horizontal mirrors (not shown) in the same manner.

While the invention has been described with regards to a particular embodiment, variations and modifications will now occur to those skilled in the art.

I claim:

1. A wide-angle viewing device comprising a rectangular housing having at least two opposed parallel internal reflecting surfaces and an entrance and exit aperture, lens means mounted in said housing and including first and second telescopic subsystems arranged in tandem, said first subsystem including an objective lens in the entrance aperture and a field lens positioned at the rear focal plane thereof, said second subsystem including an objective lens at the exit aperture and a field lens at the front focal plane thereof, an objective component forming a part of both subsystems positioned midway between the two field lenses, said component having double the refractive power of each of the other objective lenses so that each subsystem is afocal and provides unit magnification.

2. A wide-angle viewing device comprising a rectangular housing having at least two opposed parallel internal reflecting surfaces and an entrance and exit aperture, first and second telescopic optical subsystems arranged in tandem within said housing and providing substantially unit magnification, each of said subsystems including a pair of objective lenses spaced from each other a distance equal to the sum of their respective focal lengths and a field lens positioned in the focal plane of said objective lenses, an objective lens of one of said subsystems being mounted in said entrance aperture and an objective lens of the other of said subsystems being mounted in said exit aperture the other objective lenses of said subsystems being mounted adjacent each other.

3. A wide-angle viewing device comprising a rectangular housing having entrance and exit apertures, a first optical system including a pair of telescopic objective lenses and a field lens arranged in said housing to view a scene in object space and to provide substantially unit magnification thereof, said housing having at least a pair of parallel highly reflective internal surfaces to reflect light rays admitted into said housing a number of times dependent upon the angle of entrance of said light rays whereby a scrambled image of said scene in object space is obtained, a second optical system mounted in said housing in tandem with said first system and optically aligned therewith and including a pair of telescopic objective lenses and a field lens for viewing the scene imaged by said first optical system and to provide substantially unit magnification thereof, the objective lenses of each of said optical systems being spaced from each other a distance approximately equal to the sum of their respective focal lengths to provide a common focal plane with the field lens positioned in the focal plane, the light rays exiting from said first optical system entering said second optical system and being subjected to the same number of reflections undergone in traversing said first optical system whereby said scrambled image is unscrambled to provide a realistically appearing view of said scene in object space.

4. A wide-angle viewing device comprising a housing having a rectangular cross section and including plane mirrors formed on the internal surfaces thereof and having entrance and exit apertures, a first unity power telescopic optical system mounted in said housing and comprising first and second objective lenses and a field lens, said first objective lenses being positioned in said entrance aperture and said second objective lens being spaced from said first objective lens a distance equal to the sum of their respective focal length, said field lens being positioned in the focal plane of said objective lenses, a second unity power telescopic optical system mounted in said housing in tandem with said first system and optically aligned therewith and including third and fourth objective lenses and a second field lens, said third objective lens being positioned adjacent said second objective lens and said fourth objective lens being positioned in said exit aperture at a distance equal to the sum of the respective focal lengths of said third and fourth objective lenses, said second field lens being positioned in the focal plane of said third and fourth objective lenses.

References Cited

UNITED STATES PATENTS

| 984,929 | 2/1911 | Kellner. |
|---|---|---|
| 2,887,935 | 5/1959 | Scott et al. |
| 3,170,980 | 2/1965 | Pritchard. |

JOHN K. CORBIN, *Primary Examiner.*

U.S. Cl. X.R.

350—48, 202, 212, 96